(12) United States Patent
Battlogg et al.

(10) Patent No.: US 9,835,221 B2
(45) Date of Patent: Dec. 5, 2017

(54) ASSEMBLY FOR ABSORBING ENERGY IN THE EVENT OF AN OVERLOAD

(71) Applicant: GENERAL DYNAMICS EUROPEAN LAND SYSTEMS-MOWAG GMBH, Kreuzlingen (CH)

(72) Inventors: Stefan Battlogg, St. Anton I.M. (AT); Juergen Poesel, Bludenz (AT)

(73) Assignee: General Dynamics European Land Systems-Mowag GmbH, Kreuzlingen (CH)

( * ) Notice: Subject to any disclaimer, the term of this patent is extended or adjusted under 35 U.S.C. 154(b) by 0 days.

(21) Appl. No.: 15/125,645

(22) PCT Filed: Mar. 13, 2015

(86) PCT No.: PCT/EP2015/055372
§ 371 (c)(1),
(2) Date: Sep. 13, 2016

(87) PCT Pub. No.: WO2015/136109
PCT Pub. Date: Sep. 17, 2015

(65) Prior Publication Data
US 2017/0002888 A1    Jan. 5, 2017

(30) Foreign Application Priority Data
Mar. 13, 2014    (DE) .................. 10 2014 103 455

(51) Int. Cl.
*F16F 15/03*    (2006.01)
*F16F 9/53*    (2006.01)
(Continued)

(52) U.S. Cl.
CPC .................. *F16F 9/53* (2013.01); *B60N 2/24* (2013.01); *B60N 2/4242* (2013.01);
(Continued)

(58) Field of Classification Search
CPC ...... F16F 9/53; F16F 7/127; F16F 9/19; F16F 13/007
(Continued)

(56) References Cited

U.S. PATENT DOCUMENTS 4,958,704 A * 9/1990 Leiber .................... F16F 9/46
188/267
5,277,281 A    1/1994 Carlson et al.
(Continued)

FOREIGN PATENT DOCUMENTS

CN    202001547 U    10/2011
DE    102010020086 A1    11/2011
(Continued)

*Primary Examiner* — Todd M Epps
(74) *Attorney, Agent, or Firm* — Laurence A. Greenberg; Werner H. Stemer; Ralph E. Locher (57) ABSTRACT

An energy absorber reduces an excessive load between an object and an assembly in an overload event. The energy absorber includes an absorber cylinder and a piston device with an absorber piston and a piston rod. A first chamber of an absorber chamber is filled with a field-sensitive absorber fluid. The piston has an absorber valve with an absorber duct extending in an axial direction and being subject to a selective field of a field generating device. A ratio of the outer diameter of the piston rod to an outer diameter of the absorber piston is greater than 0.6 and the first chamber extends in a space around the piston rod. During the relative motion of the fastener and the holding device the field-sensitive absorber fluid is urged through the damping duct of the absorber piston.

22 Claims, 5 Drawing Sheets

(51) Int. Cl.
*B60N 2/24* (2006.01)
*B60N 2/42* (2006.01)
*B60N 2/427* (2006.01)
*B60N 2/50* (2006.01)
*F16F 7/12* (2006.01)
*F16F 9/19* (2006.01)
*F16F 13/00* (2006.01)

(52) U.S. Cl.
CPC ........... *B60N 2/42709* (2013.01); *B60N 2/50* (2013.01); *F16F 7/127* (2013.01); *F16F 9/19* (2013.01); *F16F 13/007* (2013.01); *B60N 2/42736* (2013.01); *F16F 9/532* (2013.01); *F16F 9/535* (2013.01)

(58) Field of Classification Search
USPC .................... 248/636; 188/267, 267.1, 267.2
See application file for complete search history.

(56) References Cited

U.S. PATENT DOCUMENTS

| | | |
|---|---|---|
| 6,279,702 B1 | 8/2001 | Koh |
| 6,471,018 B1 | 10/2002 | Gordaninejad et al. |
| 9,126,625 B2 * | 9/2015 | Battlogg .............. B60N 2/0276 |
| 2008/0015753 A1 | 1/2008 | Wereley et al. |
| 2008/0156602 A1 * | 7/2008 | Hiemenz .............. B60N 2/4242 188/267.1 |
| 2013/0025987 A1 * | 1/2013 | Batterbee .................. F16F 9/53 188/267.2 |
| 2013/0214570 A1 | 8/2013 | Grant et al. |
| 2015/0247548 A1 | 9/2015 | Battlogg et al. |

FOREIGN PATENT DOCUMENTS

| | | |
|---|---|---|
| DE | 102012012535 A1 | 1/2014 |
| DE | 102012017423 A1 | 3/2014 |

* cited by examiner

ASSEMBLY FOR ABSORBING ENERGY IN THE EVENT OF AN OVERLOAD

BACKGROUND OF THE INVENTION

Field of the Invention

The present invention relates to an assembly for energy absorption in an overload event. The invention in particular relates to an assembly which serves to avoid or reduce damage to objects such as persons or items in the case of single overload events. The assembly reduces the load resulting from a single occurrence of energy input on an object disposed on or coupled with the assembly. Such a single overload event involving energy input occurs with the explosion of a mine.

The assembly according to the invention is in particular employed in transporters, such as troop carriers, tanks, helicopters or the like, to protect transported persons from shocks dangerous to health or even life-threatening, for example when a mine explodes beneath the transporter.

The prior art has disclosed various assemblies allowing energy absorption. Variable pulse energy would cause considerable damage in the prior art due to a rigid coupling. Damage is understood to mean every in particular permanent disadvantage which a person or item suffers due to an event. It is for example possible to dampen shocks by way of magnetorheological or electro-rheological fluids. Using magnetorheological fluids for example provides for the application of a controlled magnetic field on a damping duct between two chambers of a damper chamber, the damping resulting from the strength of the magnetic field generated in the damping duct. These dampers are employed for damping rough road surfaces e.g. in motor vehicles under the trademark name MagneRide.

Employing magnetorheological fluids offers considerable advantages since magnetorheological fluids respond to field changes within one or a few milliseconds. When a typical damper is employed where a piston guided on a piston rod subdivides a cylindrical damper chamber into a first and a second chamber and where the damping duct passes through the piston, when employed on a mine protection seat and in the case of a mine explosion beneath for example a troop carrier, the damper may experience considerable speeds, the relative speeds reaching up to or above 5 m/sec. or 10 m/sec. or higher still.

Although magnetorheological fluids can respond to field changes within one millisecond, these speed ratios require an extremely long piston for the magnetorheological fluid flowing through the piston to respond to a changed magnetic field and to generate the desired damping.

The drawback of such a system is that for one, such an extremely long piston increases the total weight of the system. For another, such a long damping duct also increases the basic force which occurs even when no magnetic field is applied. This for example reduces the resetting speed of such a damper.

To improve these assemblies it is possible to appropriately increase the flow diameter of a damping duct which decreases the flow rate correspondingly. The drawback of such a measure is that a considerably stronger magnetic field is required to achieve the desired chain formation of the magnetorheological particles in the enlarged damping gap. This increases the power requirement of such a system which is a drawback since local energy storage devices tend to be provided since a central energy supply cannot always be ensured in an overload event.

As an alternative to increasing the flow duct diameter, the quantity of flow ducts may be increased to five or ten with the diameter remaining unchanged. This will distribute the flow to multiple ducts so that the flow rate is not increased accordingly in one single damping duct. The drawback to this solution is for one, that more space may be required and for another, that a suitable magnetic field must be applied on the plurality of damping ducts which in turn increases energy requirements.

BRIEF SUMMARY OF THE INVENTION

It is therefore the object of the present invention to provide an assembly for energy absorption in a single occurrence of an overload event which allows reliable energy absorption while reducing the total weight and requiring comparatively little energy. The energy absorber is intended to absorb energy in a single overload event involving energy input that is high enough so that, absent such an energy absorber, loads occurring would exceed permissible limits or damage to an object coupled or attached to the assembly is highly probable, so as to reduce by way of the energy absorption of the energy absorber in the overload event, the loads to an object coupled thereto or disposed thereat, such as a person or an item.

This object is solved by an assembly as claimed. Preferred specific embodiments of the invention can be taken from the subclaims.

Further advantages and features and properties of the present invention can be taken from the general description and the description of the exemplary embodiments.

The inventive assembly serves in particular for energy absorption in an overload event and comprises at least one energy absorber for energy absorption and reduction of a resulting load in particular on at least part of the assembly or on an object coupled with or provided to be coupled with the assembly. The energy absorber comprises respectively is provided with at least one fastener and at least one holding device. The fastener is preferably connected with one of the ends and the holding device is disposed at or fastened to another of the ends of the energy absorber. The energy absorber is provided to absorb the energy of a relative motion between the fastener and the holding device and in particular to dissipate energy or to convert it to heat, in particular so as to reduce the load acting on an object that can be connected or coupled with the assembly. The energy absorber comprises an absorber cylinder and a piston device with an absorber piston and a piston rod connected therewith. The absorber piston defines on the absorber cylinder at least one first chamber of an absorber chamber. The first chamber is at least partially filled with a field-sensitive absorber fluid. At least one absorber valve having at least one absorber duct is provided or configured at the piston device. The absorber duct extends in an axial direction of the absorber piston and in particular approximately in parallel or parallel to an axial direction of the absorber cylinder. The absorber duct can be exposed to a field originating from at least one electric coil acting as a field generating device. A ratio of the outer diameter of the piston rod to an outer diameter of the absorber piston is larger than 3:5 (or 0.60) and the first chamber that is at least partially filled with the field-sensitive damping fluid extends in a space and in particular an annular chamber around the piston rod so that during the relative motion of the fastener and the holding device of the energy absorber during the energy absorption in the overload event the field-sensitive damping fluid is urged through the damping duct of the absorber piston.

The assembly according to the invention has many advantages. A considerable advantage of the inventive assembly is that the outer diameter of the piston rod is at least half the size of the outer diameter of the absorber piston so that the absorber piston which is subjected to tensile load while absorbing energy only displaces a considerably reduced quantity of the absorber fluid. Since the displaced volume of the absorber fluid is computed from the piston stroke and the annular surface around the piston rod, a thicker piston rod noticeably reduces the displaced volume of the absorber fluid.

The assembly is configured for a single load. In the case of an explosion or the like the assembly dissipates respectively absorbs energy to reduce loads on an object or on the dampened end of the assembly.

The energy absorber is in particular suitable and configured to absorb or convert energy in a single overload event involving energy input that is so high that absent the energy absorber the loads imposed on an assembly component would be excessive and/or damage to the object would be probable or highly probable or expected. The energy absorption respectively dissipation of energy respectively conversion of energy by the energy absorber in the overload event allows to reduce loads and to avoid damage to the coupled object.

An object is coupled with the assembly if the object is e.g. disposed or placed on and/or fastened to a transporting surface.

An absorber duct extending in an axial direction of the absorber piston is understood to mean an absorber duct which extends between a first end of the absorber piston and the second end of the absorber piston approximately in a straight line. The absorber duct may in particular also extend slightly obliquely through the absorber piston.

The thicker piston rod consequently reduces not only the displaced volume of the absorber fluid but the flow rate of the absorber fluid through the absorber duct in the absorber piston is noticeably reduced correspondingly so that the length of the absorber piston can be reduced. This lowers the weight.

The outer diameter of the piston rod is intentionally chosen large although the outer diameter is not required because of the loads occurring.

The inventive assembly is suited to be employed in a great variety of applications. The assembly may for example be used in transporters such as tanks, helicopters, ships, airplanes, or else in troop carriers or cars to dampen severe shocks e.g. from explosions and the like.

In an advantageous specific embodiment the ratio of the outer diameter of the piston rod to an outer diameter of the absorber piston is larger than 2:3 and in particular larger than 3:4 and preferably larger than 4:5. Diameter ratios are possible where the outer diameter of the piston rod is 9:10 relative to the outer diameter of the absorber piston or more. Ratio values of the outer diameter of the piston rod to an outer diameter of the absorber piston of larger than 0.60 and in particular larger than 0.70 and preferably larger than 0.82 are possible and preferred.

The piston rod is preferably configured round or rounded. It is also possible for the piston rod and/or the absorber piston to show polygonal and/or only partially rounded outer surfaces. In these cases the ratio indicated above relates to a typical outer dimension of the piston rod or correspondingly, to a typical outer dimension of the absorber piston. These outer dimensions of the cross-section of the piston rod and/or of the absorber piston are in particular provided in a ratio that is characteristic of the chamber volumes of the first chamber of the absorber chamber.

In advantageous specific embodiments the absorber duct is provided at the absorber piston, and a length of the absorber piston is larger than an outer diameter of the absorber piston. The absorber duct is in particular longer than the outer diameter of the absorber piston. These configurations are advantageous since they enable sufficient damping even in the case of very high relative speeds. The fact that according to the invention a large outer diameter of the piston rod is chosen, the length of the absorber piston per se is considerably shorter than when using a normal, thin piston rod which is configured in relation to the loads occurring.

The piston rod preferably comprises a hollow space whose diameter is larger than is a wall thickness of the wall surrounding the hollow space. The hollow space is in particular configured at the piston rod in the shape of at least one blind hole. In particular a substantially coaxial blind hole is provided which is in particular configured open at the end opposite the absorber piston. Such a hollow space offers considerable advantages since for one, the total weight is reduced and for another, the hollow space is also suitable to receive further units and elements. Thus, for example part of the control device or the entire control device may be provided on the one or more hollow spaces of the piston rod. Another hollow space and/or the same hollow space may additionally or instead accommodate at least one energy storage device for energy supply. In any case an energy storage device is particularly preferably provided. In many configurations the assembly ought to be operable for 24 hours, 48 hours or 72 hours or longer without any external power supply. A typical application period should in particular be possible without power supply. Suitable energy storage devices in particular include capacitors such as so-called Supercaps. The use of an accumulator is likewise preferred.

When the assembly is in a basic or idle state the absorber fluid is preferably located in the first chamber in an annular chamber around the piston rod.

In advantageous specific embodiments the absorber piston subdivides the absorber chamber into the first chamber and a second chamber. The second chamber is in particular at least partially filled with the absorber fluid.

In this configuration the absorber fluid is transferred at least partially from the first chamber to the second chamber in an overload event. Thereafter the absorber fluid may be transferred back into the first chamber following the overload event or after a first incident within the overload event so that in the case of another, subsequent incident, the first chamber again contains absorber fluid.

One single overload event may comprise a number of incidents. Thus, in the case that a mine explodes beneath an armoured vehicle, the vehicle may first be lifted up in the air. The is the first incident. The first incident may involve extreme acceleration. Thereafter the armoured vehicle falls back down on the ground. The impact is a second incident in the same overload event.

Or else it is possible for the absorber chamber to consist of the first chamber only and for the first chamber to be provided on the first side of the absorber piston while the second side of the absorber piston is not provided with a second chamber or at least no second chamber that is sealed tight versus the exterior. The second side of the absorber piston may be provided with a variable hollow space which is for example open to the environment. Since the assembly is preferably not provided for a plurality of incidents but is as a rule provided to be applied in 1, 2 or 3 incidents, permanent damping operation is not required. It is sufficient to have reliable energy absorption for one or optionally two immediately successive explosions.

In preferred embodiments a radial clearance of the annular chamber from an axis of symmetry of the absorber cylinder is larger than a radial distance of the absorber duct from an axis of symmetry of the absorber cylinder.

Preferably a radius of the piston rod is larger than a radial distance of the absorber duct from an axis of symmetry of the absorber cylinder. Preferably a flow duct extends from the first chamber to the absorber valve which flow duct at least partially extends radially inwardly. The absorber valve and/or the absorber duct is preferably disposed radially further inwardly than is the flow duct.

In preferred embodiments the absorber piston has an electric coil disposed at it for the field generating device with the windings of the electric coil extending substantially around an axis transverse to a longitudinal axis of the absorber cylinder. This means in particular that an axis of the electric coil is aligned transverse to a longitudinal axis of the piston device. This allows to generate a very effective magnetic field over the majority of the length and in particular over the entire length of the absorber duct. The electric coil is preferably dimensioned so as to be operable only for the duration of an overload event (event) of e.g. 100 ms duration. This allows a thinner, more lightweight and more cost effective configuration of the electric coil, the power supply wiring and other components. This allows a more economic realization of the assembly respectively the actuator. In the case of extended power application the electric coil would be overloaded and might burn out.

In advantageous configurations at least one reflux duct is provided wherein at least one reflux duct may be provided with at least one one-way valve. Such a reflux duct enables the reflux of the absorber fluid from the second chamber back into the first chamber as a first incident of an overload event is terminated. The reflux duct may be released in relation to the stroke.

In advantageous embodiments the operating pressure of the absorber fluid in the first chamber in the idle state is less than 10 bar and in particular less than 1.5 bar. The operating pressure of the absorber fluid in the first chamber in the idle state may equal the ambient pressure. The maximum mean operating pressure provided in the first chamber in the damping state is preferably larger than 100 bar and in particular larger than 500 bar.

The operating pressure in the second chamber in the idle state is preferably less than 10 bar and in particular less than 1.5 bar and it may also correspond to the ambient pressure. It is particularly preferred for the operating pressure in the second chamber to be less in the damping state than in the idle state. This means that in the damping state the operating pressure in the second chamber decreases. In the damping state there is preferably a negative pressure in the second chamber relative to the ambient pressure.

Low operating pressures in the idle state of e.g. 2 bar or 1.5 bar or even ambient pressure are particularly advantageous since the seals are hardly or even not at all stressed. A high operating pressure in an overload event may be taken into account in the structure. Since the system is not configured for permanently damping powerful shocks, the seals exposed to the high operating pressures are "treated mildly" in the normal state. The sealing properties can be ensured permanently. Other than in a system enclosed by seals, the liquid may be introduced into the energy absorber respectively the absorber chamber in a cartridge so as to ensure a safe, tight sealing of the liquid and the handling in assembling is facilitated. Such a cartridge may for example be configured as a film bag, a thin-walled metal or plastic container or the like and provided to open or burst automatically in an overload event.

In preferred embodiments at least one biasing device and/or at least one resetting device is provided between the fastener and the holding device which in particular act as an in extension spring. This causes automatic resetting of the assembly to the idle state after an overload event has occurred.

In advantageous configurations the second chamber is defined by the absorber piston, the absorber cylinder, and an end cover. The end cover may seal the second chamber completely. Or else the end cover may only prevent dust or moisture or the like from entering the second chamber when the assembly is in the idle state.

Particularly preferably the assembly does not show in the absorber chamber a partitioned or separate equalizing volume for the piston rod volume. This means that as the absorber piston extends from the absorber chamber, a negative pressure builds in the second chamber while as the absorber piston retracts, the internal pressure increases overall.

In advantageous configurations at least one shearing device is provided which allows a relative motion between the absorber cylinder and the piston device only as the load reaches a level where permissible shearing forces of the shearing device are exceeded and destruction of the shearing device is caused. Such a shearing device in particular comprises at least one shearing bolt which shears off as the specified load is exceeded and then enables a relative motion between the absorber cylinder and the piston device and thus a relative motion between the fastener and the holding device. This means that damping is performed only with high loads namely, as the limit load on the shearing device is exceeded.

It is also possible and preferred to provide a shearing device which in normal operation allows relative motion between the absorber cylinder and the piston device that is limited to a specified range. A relative motion between the absorber cylinder and the piston device over and beyond the specified range is only enabled as the load reaches a level where permissible shearing forces of the shearing device are exceeded and the shearing device is destroyed. This configuration offers the possibility of a comfort function to dampen weak shocks in normal operation. The occurrence of an overload event such as a mine explosion causes the shearing device respectively the shearing bolt of the shearing device to shear off, enabling energy absorption in this overload event. The limiting of the relative motion in normal operation ensures that a suitable motion stroke of the energy absorber is available for an overload event.

Instead of a shearing device a bolt may be used which is moved by means of a pyrotechnical blasting charge. An electric control unit is used to trigger the blasting charge. Instead of the pyrotechnical blasting charge, special shape-memory alloys may be used.

In advantageous specific embodiments at least part of the control device and/or at least part of the energy storage device is disposed in the hollow space of the piston rod.

Preferably the assembly comprises a seat device or at least one seat device. The holding device is connected with the seat device and the fastener can be connected with the body of a transporter. This allows to dampen movements of the seat device.

The assembly comprises in particular a seat device of a motor vehicle and at least one energy absorber. In all the cases the seat device preferably comprises a seat frame and at least one and in particular one respectively exactly one seat. The energy absorber is disposed between the seat and the seat frame.

It is possible for the seat device to be attached via a pair of units at least one of which units comprising the energy absorber. It is also possible for the units to comprise one energy absorber each. Both units may serve to absorb shocks in various movement directions. It is also possible for both units to serve identical purposes. It is also possible for one of the units to comprise a damper device for damping normal shocks in operation while the other of the units comprises an energy absorber for energy absorption in the case of incidents.

It is also possible to install two units. For example mine protection seats having two columns allow to build in two systems or units. Then the absorber cylinders respectively comprising the fastener and the holding device may be configured e.g. cylindrically and having no protruding arms. It is also possible to distribute the functions to both the units. For example one column may contain the damping and the other column, the resetting. With two units or energy absorbers provided, each of the energy absorbers may show just half the force or half the operating range. It is possible for an energy absorber to dampen a first explosion and for a second, to dampen a second explosion or the impact on the ground following the first explosion.

The increase of the piston diameter rod requires a considerably reduced volume to pass through the absorber piston. This results in lower flow rates, thus allowing to reduce the length of the absorber piston correspondingly. In the idle state the system may be unpressurized or show a relatively low excess pressure. In an overload event the internal pressure may considerably increase up to 400 bar or 600 bar or the like. This pressure is not applied permanently though but only in an overload event or as damage occurs, i.e. for example as a mine explodes. Since the pressures in a normal operation state are low, the stresses on all the seals are low. These seals are thus not required for permanently sealing against high excess pressure but only in the relatively short event of damage. Basically, a once-only damping is provided where energy absorption may take place one, two, three, or four times.

In the case of a mine explosion two successive incidents can typically arise. In the case of a mine explosion even armoured vehicles having a considerable total weight can be thrown in the air. A first incident in this overload event occurs with the explosion as the vehicle is lifted up in the air. The assembly with the seat device then protects a person sitting thereon against excessive loads and stresses. Thereafter there is a second incident within the overload event namely, as the vehicle falls back down on the ground. This second incident tends to be considerably less intense and damping is to be adapted accordingly.

One advantage is that the absorber fluid surrounding the piston radially outwardly rod is used for damping and in the case of damage it flows from radially outwardly into a radially inwardly region to pass through the absorber piston and the absorber duct disposed therein in a radially further inwardly region. To increase effectiveness the absorber duct may be subdivided into part ducts by means of partition walls or dividers.

The entire assembly and/or at least a unit provided thereat and/or an energy absorber is highly useful in particular if the energy absorber controls velocities of above 5 m/sec so that a passenger will suffer the slightest possible injuries.

In all the configurations the assembly is in particular subjected to tensile stress in an overload event.

In all the configurations it is preferred to allow retrofitting an existing assembly. Or else the assembly may be retrofitted.

The absorber valve may comprise one or two and optionally more absorber ducts. The magnetic circuit with the electric coil preferably comprises a core of a ferromagnetic material. Overall the assembly forms an energy absorber for incidents or heavy shocks.

A single overload event involving a high energy input may occur not only as a mine explodes. Such a single overload event occurs e.g. in an off-road single-vehicle accident for example if the driver loses control and the vehicle makes an unanticipated and unpredictable fall down a bank or the like and experiences a hard impact landing in a spot deeper down. In these accidents the strength of the energy input in the overload event cannot be derived from the vehicle speed but it depends on the height of the fall which, however, cannot be derived e.g. from the speed of the vehicle.

Therefore it is possible and preferred with the present invention to protect the passengers in motor vehicles in so-called run off-road accidents which e.g. in the USA are responsible for ca. 50% of fatal traffic accidents.

Road vehicles such as cars, SUVs, trucks etc. running off paved roads into rough terrain due to distraction, tiredness, and bad weather is particularly frequent. Vehicles showing an assembly according to this invention are preferably equipped with a seat construction with a seat and a seat frame where the previously described energy absorber absorbs the majority of the impact energy which in particular involves vertical or substantially vertical effects. To prevent dangerous spine injuries to passengers, there is therefore provided between the seat and the seat frame, at least one energy absorber to cushion the vertical forces and/or the forces parallel to the seat backrest and/or the forces perpendicular to the seat area. These forces build up in a hard (at least partially vertical) impact of the vehicle off the roadway. In these overload events the impact energy that must be absorbed acts largely or substantially or nearly completely in the vertical direction.

The invention is primarily not provided to absorb energy in head-on collisions. For head-on collisions on flat roads, motor vehicles are provided with crumpling zones or airbags.

The strength of loads acting in the vertical in overload events and road-off accidents or the strength of the vertical loads in mine explosions cannot be derived from parameters preceding the overload event since they cannot be estimated or measured.

It is not mandatorily required for a sensor to sense that the vehicle is getting off the road.

In all the specific embodiments, configurations, and exemplary embodiments, the object provided to be coupled with the assembly can be indirectly or directly coupled with the assembly. The object may be disposed indirectly or directly on the assembly or on a component connected therewith. The connection may be fixed and/or detachable. Or else the object is placed on the assembly or a component connected therewith and held in place by way of weight force.

In all the cases the energy absorber can be installed in the vertical, the horizontal or else inclined. Rerouting may be provided to dissipate vertical forces.

BRIEF DESCRIPTION OF THE SEVERAL VIEWS OF THE DRAWING

Further advantages and properties of the present invention can be taken from the description of the exemplary embodiments which will be discussed below with reference to the enclosed figures.

The figures show in.

DESCRIPTION OF THE INVENTION

Figure 1:
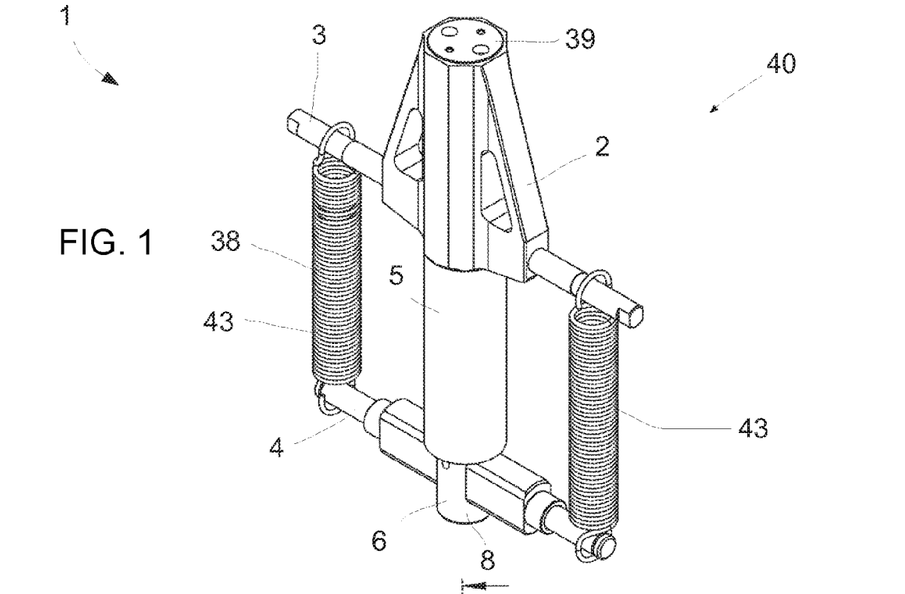
FIG. 1 a schematic perspective view of an inventive assembly.

FIG. 1 shows a schematic perspective view of an inventive assembly 1. The assembly comprises an absorber cylinder provided at one of its ends with a fastener 3 and at the other of its ends, with a holding device 4. The holding device 4 and the fastener 3 each comprise two laterally protruding arms where one biasing spring 43 each of a biasing device 38 is disposed for transferring the assembly 1 back to the idle state 40 following an overload event 63, which is also shown in FIG. 1.

The assembly 1 serves for energy absorption or damping of relative motions between the fastener 3 and the holding device 4. The holding device 4 is connected with the piston device 6 of the energy absorber 2 while the fastener 3 is fixedly connected with the absorber cylinder 5. At the upper end one can see an end cover 39 which closes off and defines the second chamber, which is presently hidden in the interior, of the absorber chamber 9.

Figure 2:
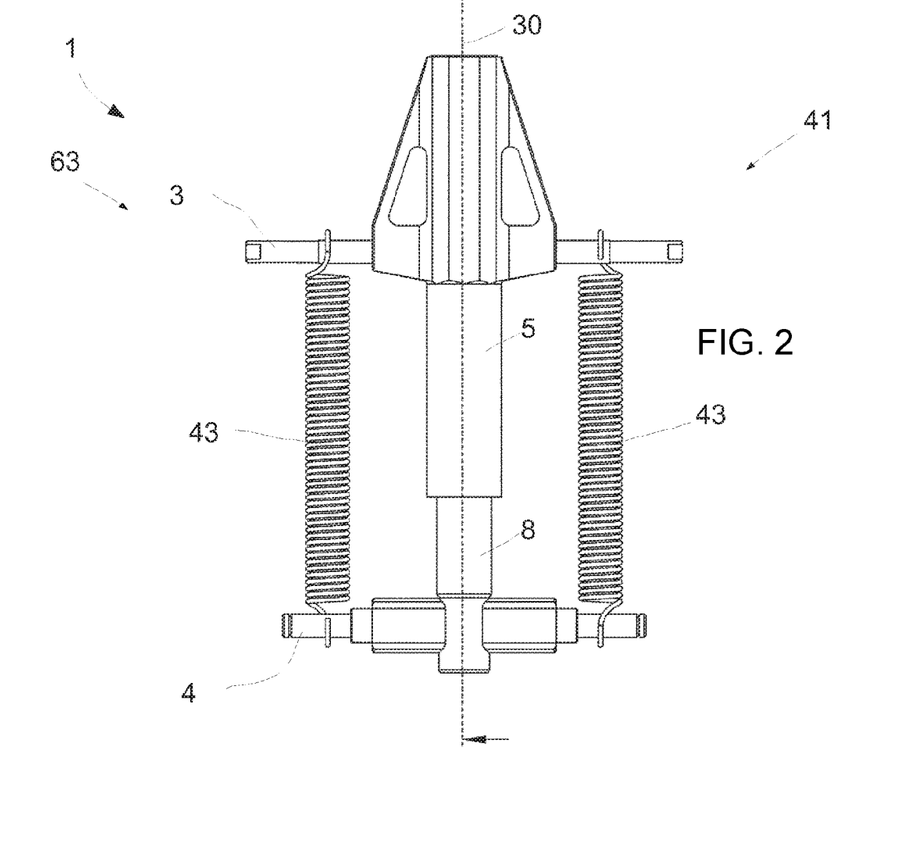
FIG. 2 a front view of the assembly of FIG. 1.

FIG. 2 shows a front view of the assembly 1. An axis of symmetry 30, through which the section according to FIG. 3 runs, extends in the center through the absorber cylinder 5.

Figure 3:
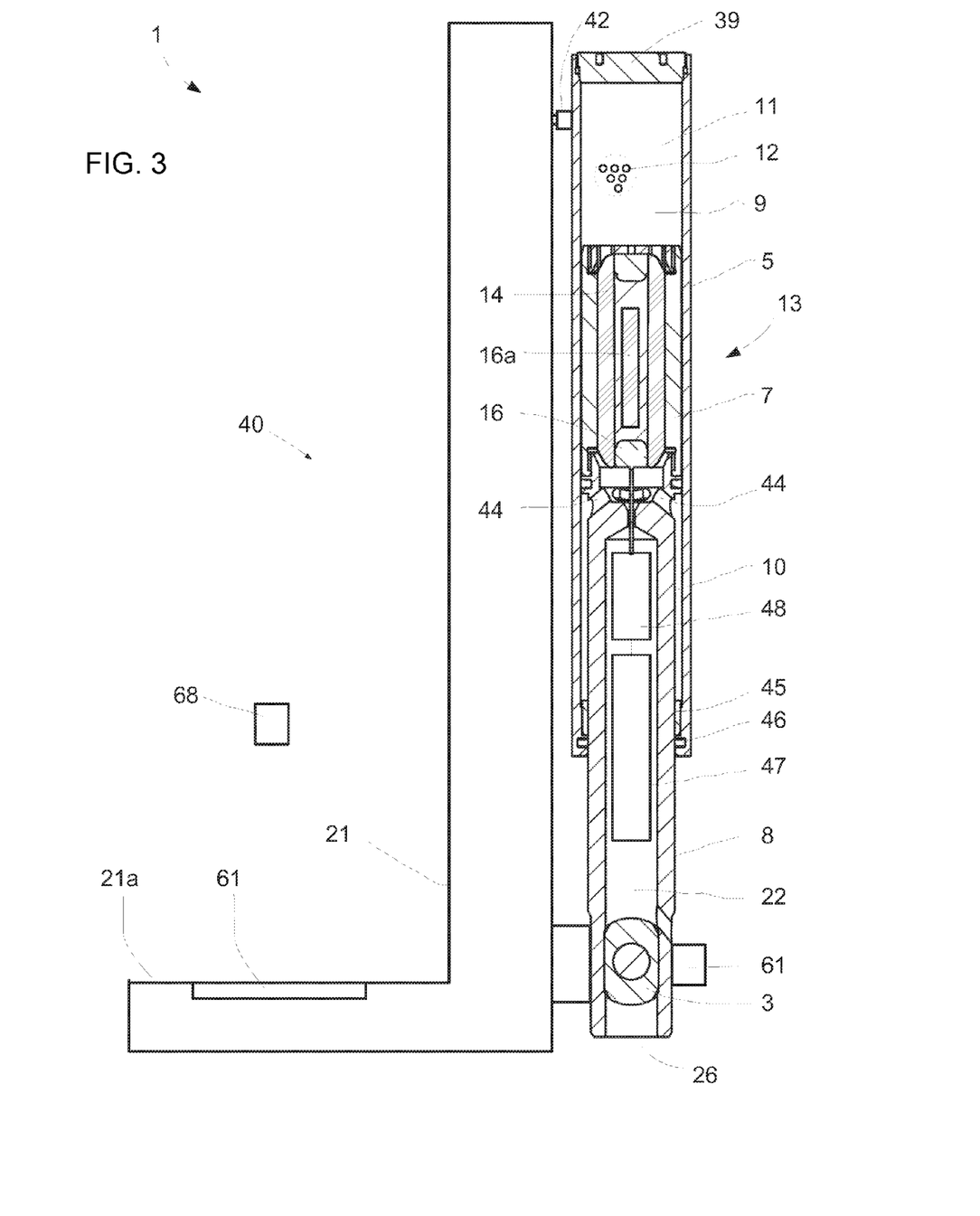
FIG. 3 a sectional side view of the assembly according to FIG. 1 in the damping state.

FIG. 3 shows the section according to FIG. 2 in a damping state 41 during an overload event 63. Also shown is a seat device 21 with a seat area 21a on which a person such as a soldier can sit in a troop carrier. Or else this may be a schematic picture of a seat in a motor vehicle for road traffic, such as the driver and/or passenger seat in a car.

In the interior of the absorber cylinder 5 one can recognize a section of the absorber piston 7 connected with the piston rod 8 of the piston device 6. The absorber piston 7 subdivides the absorber chamber 9 in the interior of the absorber cylinder 5 into a first chamber 10 and a second chamber 11. The second chamber 11 is outwardly defined by the end cover 39 and in this case, sealed airtight.

In the idle state the first chamber 10 is at least partially and in particular completely filled with absorber fluid 12. As an overload event 63 occurs, the piston rod 8 is pulled out of the absorber cylinder 5 so that the absorber fluid 12 in the first chamber 10 passes through the absorber duct 14 in the absorber piston 7 and into the second chamber 11. In the idle state the second chamber 11 may already be partially filled with absorber fluid 12. Or else, the second chamber 11 when in the idle state may be hardly or not at all filled with absorber fluid 12 but only with air or another compressible gas or medium.

It can be clearly seen that the piston rod 8 has a very large diameter so that only a comparatively narrow annular gap around the piston rod remains for the first chamber 10. Due to this, the extending absorber piston 7 only displaces a comparatively small volume of absorber fluid 12 out of the first chamber 10. Therefore the flow rates of the absorber fluid 12 in the absorber duct 14 remain low even in the case of incidents or overloads 63 caused by explosions so that the length of the absorber piston 7 is sufficient to influence the flow as desired by way of the magnetic field of the electric coil acting as a field generating device 16.

The FIG. 3 additionally shows a permanent magnet 16a which generates a constant magnetic field for basic damping. The electric coil 16 modulates the field effective in the absorber duct 14 in dependence on the currently desired properties. The magnetic field of the permanent magnet 16a may be boosted or attenuated by a magnetic field of the electric coil 16. The permanent magnet 16a is drawn by way of example only, it may be disposed in any other suitable position.

When the flow fluid 12 is made to pass from the first chamber 10 into the second chamber 11, the absorber fluid 12 is transferred inwardly through the radial flow apertures 44 which extend radially obliquely from the outside to the interior. This means that the flow duct or the absorber duct 14 is disposed radially further inwardly than the first chamber 10. This enables efficient use of the interior of the absorber piston 7 to generate the required magnetic field, and for the absorber duct 14.

In this case the piston rod 8 is designed considerably thicker than stability requires. Therefore the piston rod 8 is provided with a hollow space 22 which is configured as a blind hole. The blind hole 22 extends from the end 26 opposite the piston into the piston rod 8. The hollow space 22 may extend up to just in front of the absorber piston 7 so that the length of the hollow space 22 extends over three quarters or more of the length of the piston rod 8 up to the absorber piston 7. The hollow space 22 can be employed accordingly. The control device 48 and an energy storage device 47 are disposed in the interior of this hollow space 22. The control device 48 is connected with the electric coil 16 for controlling the same. Furthermore the control device 48 is connected with a sensor device 61 to absorb and handle the loads on the seat device 21. More sensor units 68 may be provided. For example a passenger may carry a sensor unit 68 on his person.

The energy storage device 47 ensures that even in case of power failure on board the transporter the assembly 1 will at all times provide sufficient energy for controlling the energy absorber 2. The energy storage device may be a capacitor or an accumulator.

In this case the absorber piston 7 does not only separate the first chamber 10 from the second chamber 11 but it also forms a flow valve 13 which can be controlled by the control device 48.

Figure 4:
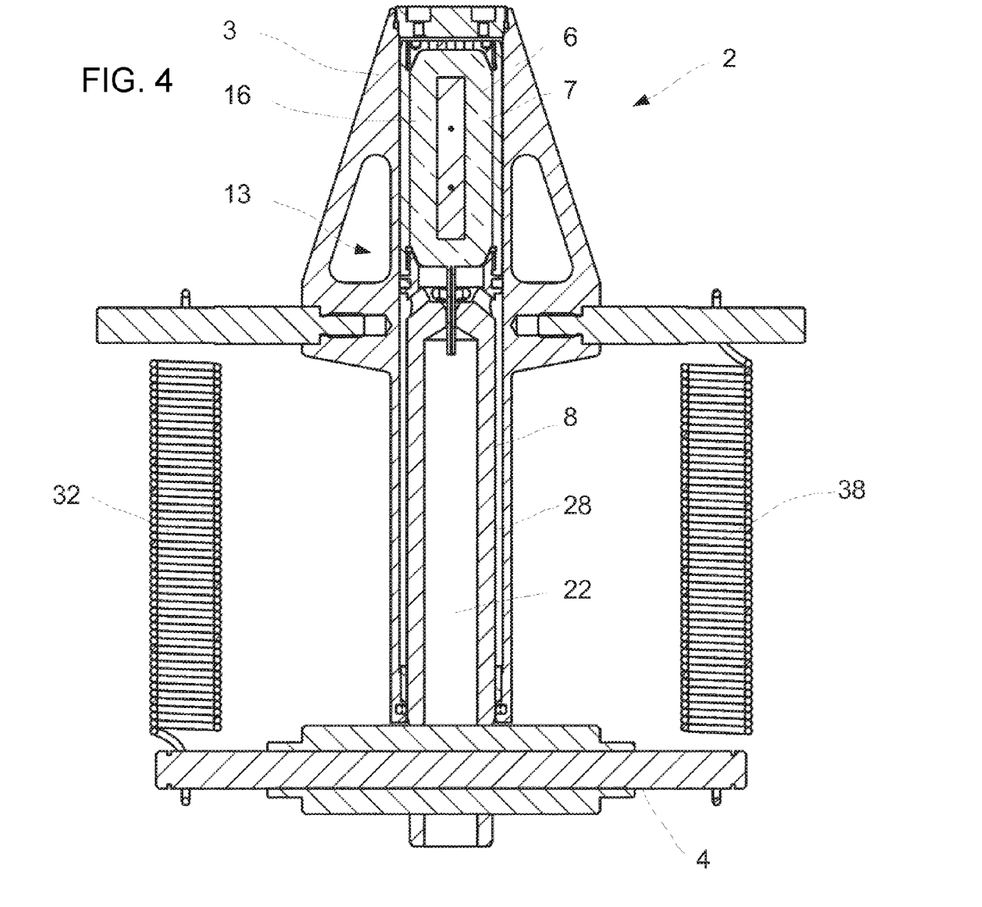
FIG. 4 a sectional front view of the assembly according to FIG. 1 in the idle state.

FIG. 4 illustrates another cross-section of the assembly 1 with the biasing device 38 again shown in section as a resetting device 43. For the sake of clarity, the energy storage device 47 and the control device 48 in the hollow space 22 are not shown. The first chamber 10 forms an annular chamber 28 around the piston rod 8. A radial extension of the annular chamber 28 is less than a wall thickness of the hollow piston rod 8.

Figure 5:
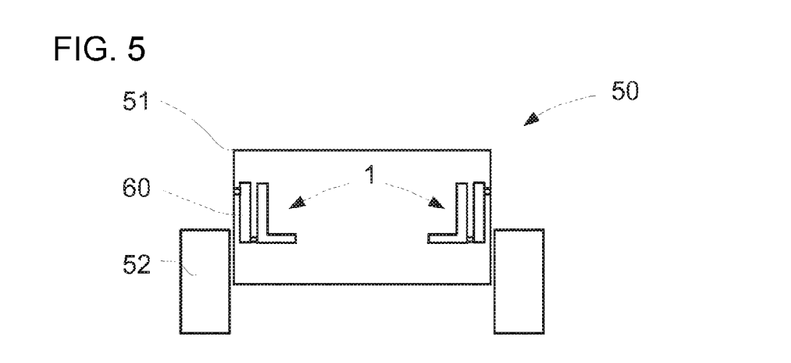
FIG. 5 a vehicle with inventive assemblies to protect passengers in explosions.

FIG. 5 shows a schematic illustration of a transporter 50 such as a troop carrier which is provided with the assemblies 1 according to the invention to protect the passengers in the case of explosions. The transporter 50 has a body 51 to which the mine protection seats 60 representing the assemblies 1 are attached. The vehicle 50 can travel by way of wheels with tires 52. In the case of an overload event 63 such as an explosion the vehicle 50 is thrown up in the air wherein the seat devices 21 of the assemblies 1 are subjected to dampened movement so as to prevent permanent impairment to the persons seated thereon.

Figure 6:
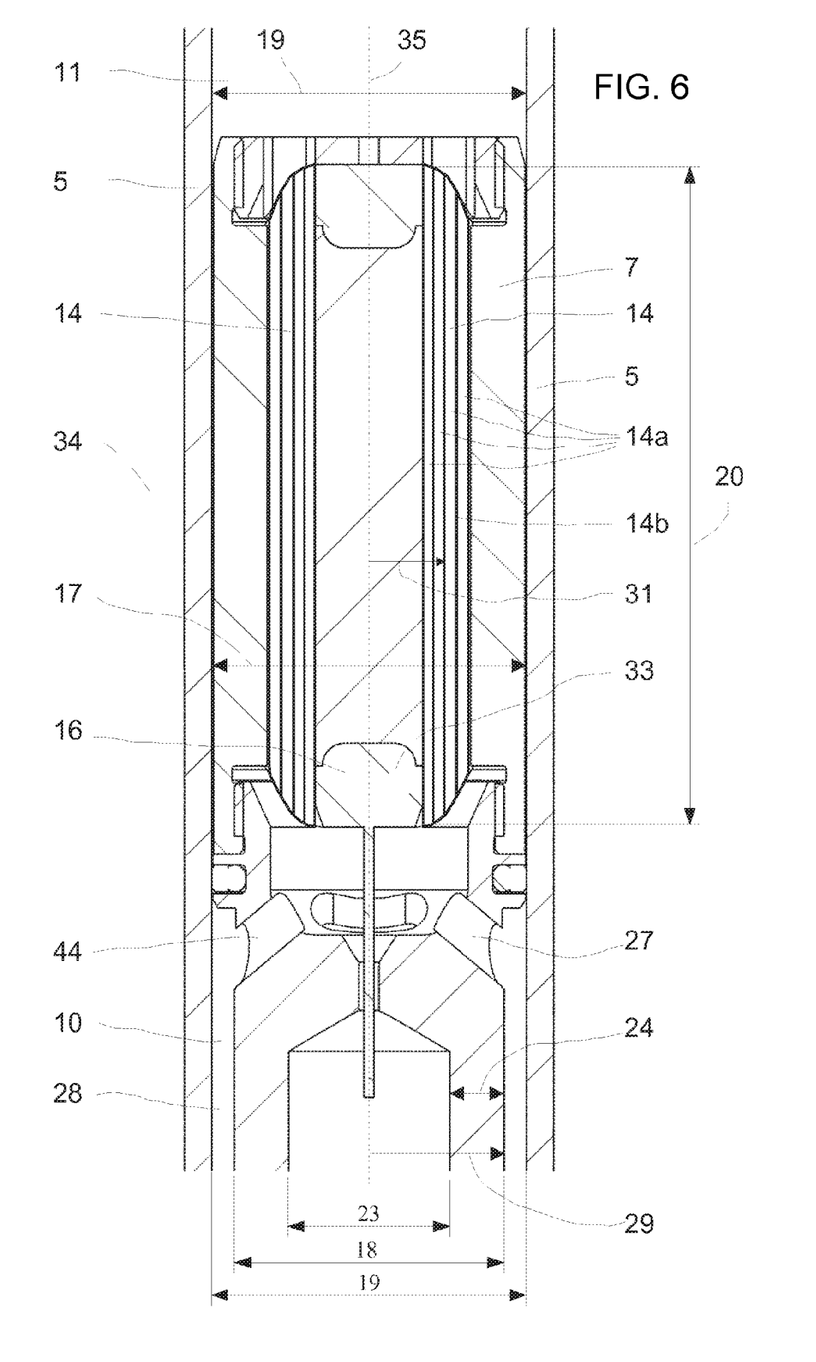
FIG. 6 an enlarged section of the piston region of the assembly according to FIG. 1.

FIG. 6 shows an enlarged section of the piston region of the assembly 1 according to FIG. 1 for better illustration of the details. One can see radially outwardly the absorber cylinder 5 with the absorber piston 7 and the piston rod 8 following downwardly disposed in the interior. Above the absorber piston 7, the second chamber 11 is located while beneath the absorber piston 7, the first chamber 10 configured as an annular chamber 28 is disposed.

The outer diameter 18 of the piston rod 8 is considerably enlarged compared to conventional energy absorbers 2 and in this case it is more than three quarters of the inner diameter 19 of the absorber cylinder 5.

The inner diameter 19 of the absorber cylinder 5 virtually corresponds to the outer diameter 17 of the absorber piston 7 wherein strictly speaking the outer diameter 17 of the absorber piston 7 slightly differs from the inner diameter 19 of the absorber cylinder 5 to enable low-friction gliding of the absorber piston 7 within the absorber cylinder 5.

The wall thickness 24 of the hollow piston rod is more than twice the radial dimension of the annular chamber 28 of the second chamber 11.

The inner diameter 23 of the hollow space 22 is preferably at least half the size of the inner diameter 19 of the absorber cylinder 5. A large hollow space 22 provides a large storage capacity for example to accommodate the control device 48 and the energy storage device 47. Weight is also saved.

The electric coil 16 is provided in a central region and comprises a plurality of windings 33.

The absorber duct 14 may comprise multiple walls 14b forming a partition structure and providing a plurality of damping gaps 14a at the absorber duct 14. This increases the feasible damping force. A mean radial clearance 31 from a central longitudinal axis or axis of symmetry 38 to the absorber duct 14 is considerably smaller than a radial distance or radial clearance 29 from the axis of symmetry 35 to the annular chamber 28 of the first chamber 10. Radial flow apertures 44 form flow ducts 27 which transfer the absorber fluid 12 from the annular chamber 28 which is the second chamber 11, to the absorber duct 14.

The length 20 of the absorber piston 7 is larger than an outer diameter of the absorber piston 7. This is to ensure that the retention time of the magnetorheological particles of the absorber fluid in the absorber duct 14 is sufficient for the magnetic field 15 of the electric coil 16 to influence the absorber fluid 12 as desired.

Figures 7, 8, 9:
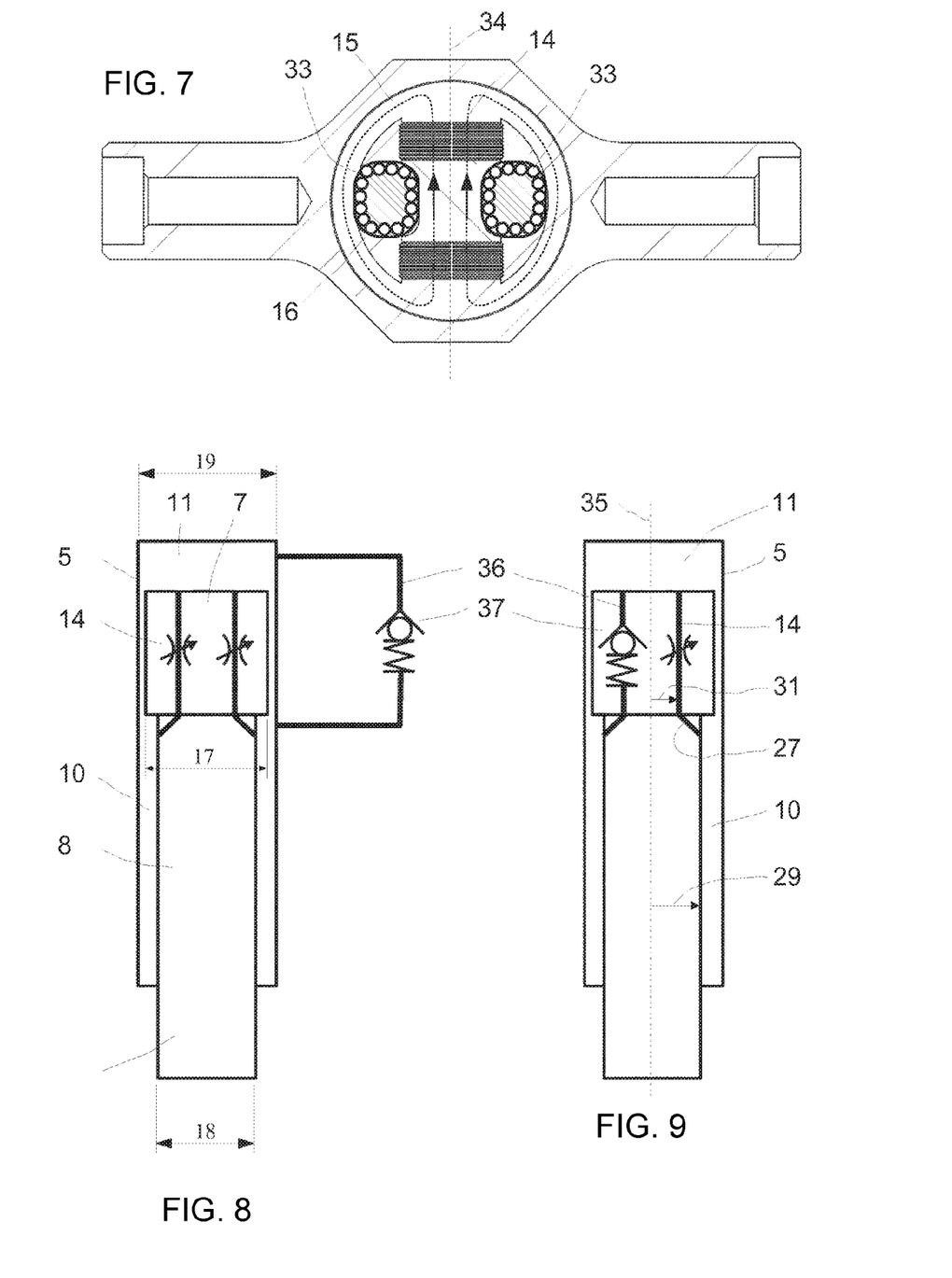
FIG. 7 a cross-section of the piston.
FIG. 8 a schematic illustration of another embodiment.
FIG. 9 a schematic illustration of yet another embodiment.

FIG. 7 shows a cross-section of the assembly 1 where the cross-sectional area of the absorber cylinder 5 can be seen. The electric coil 16 is illustrated in cross-section with individual windings 33 shown. Furthermore the absorber duct 14 with the individual damping gaps 14a can be seen. The axis of symmetry 34 of the electric coil is likewise illustrated. The magnetic field 15 generates the magnetic field lines shown in dotted lines which pass through the damping gaps 14a of the absorber duct 14 perpendicular or nearly perpendicular.

FIGS. 8 and 9 show schematic illustrations of the assembly 1 with a reflux duct 36 provided outside of the absorber cylinder 5 in FIG. 8. A one-way valve 37 causes flow of the absorber fluid 12 in one direction only.

The flow duct 36 may be located entirely outside of the absorber cylinder. Or else it is possible to provide the flow duct 36 in an inner groove of the absorber cylinder 5 to provide an opened reflux duct in a specified position. For example, shortly before the retracted stroke position is reached, a reflux connection may be provided through which the absorber fluid transferred into the second chamber 11 flows back into the first chamber 10.

Or else it is possible, as illustrated in FIG. 9, for a reflux duct 36 to extend through the absorber piston 7 or on the surface of the absorber piston 7 which in the normal state is closed by means of a check valve or one-way valve 37.

On the whole the invention provides an advantageous assembly 1 with which to equip a mine protection seat or seat in a motor vehicle so as to provide reliable protection to persons in the case of incidents such as explosions or run-off-road accidents and the like, which considerably reduces the risk of injuries.

LIST OF REFERENCE NUMERALS

| | |
|---|---|
| 1 | assembly |
| 2 | energy absorber |
| 3 | fastener |
| 4 | holding device |
| 5 | absorber cylinder |
| 6 | piston device |
| 7 | absorber piston |
| 8 | piston rod |
| 9 | absorber chamber |
| 10 | first chamber |
| 11 | second chamber |
| 12 | absorber fluid |
| 13 | absorber valve |
| 14 | absorber duct |
| 14a | damping gap |
| 14b | wall |
| 15 | field |
| 16 | field generating device, electric coil |
| 16a | permanent magnet |
| 17 | outer diameter (of 7) |
| 18 | outer diameter (of 8) |
| 19 | inner diameter (of 5) |
| 20 | length (of 14) |
| 21 | seat device |
| 21a | seat area |
| 22 | hollow space (in 8) |
| 23 | diameter (of 22) |
| 24 | wall thickness (of 8) |
| 25 | wall |
| 26 | end |
| 27 | flow duct |
| 28 | annular chamber |
| 29 | radial clearance |
| 30 | axis of symmetry (of 5, 8) |
| 31 | radial distance |
| 32 | resetting device |
| 33 | winding |
| 34 | axis (of 16) |
| 35 | longitudinal axis |
| 36 | reflux duct |
| 37 | one-way valve |
| 38 | biasing device |
| 39 | end cover |
| 40 | idle state |
| 41 | damping state |

| | |
|---|---|
| 42 | shearing device |
| 43 | biasing spring |
| 44 | radial flow aperture |
| 45 | guide bushing |
| 46 | seal |
| 47 | energy storage device |
| 48 | control device |
| 50 | transporter, vehicle |
| 51 | (vehicle) body |
| 52 | tire |
| 60 | mine protection seat |
| 61 | sensor device |
| 63 | overload event |
| 68 | sensor unit |

The invention claimed is:

1. An assembly for energy absorption in an overload event to reduce a resulting load on an object coupled with the assembly, the assembly comprising:
an energy absorber configured, in a single overload event involving energy input that is so great that, absent such an energy absorber, damage to the object is highly probable, to absorb energy so as to avoid excessive load on the object in the overload event by way of energy absorption of the energy absorber;
said energy absorber having a fastener and a holding device and being configured to absorb energy in a relative motion between said fastener and said holding device;
said energy absorber having an absorber cylinder and a piston device with an absorber piston and a piston rod connected therewith, said absorber piston defining at least one first chamber of an absorber chamber in said absorber cylinder;
a field-sensitive absorber fluid at least partially filling said first chamber;
an absorber valve disposed on said piston device with at least one absorber duct extending in an axial direction and being disposed for exposure to a field of a field generating device;
wherein a ratio of an outer diameter of said piston rod to an outer diameter of said absorber piston is greater than 3:5 and said first chamber, which is at least partially filled with said field-sensitive absorber fluid, extends in a space around said piston rod so that, during the relative motion of said fastener and said holding device of said energy absorber during the energy absorption in the overload event, said field-sensitive absorber fluid is urged through said damping duct of said absorber piston.

2. The assembly according to claim 1, wherein the ratio of the outer diameter of said piston rod to the outer diameter of said absorber piston is greater than 2:3 or greater than 3:4 or greater than 4:5.

3. The assembly according to claim 1, wherein said absorber duct is formed on said absorber piston and wherein a length of said absorber piston is greater than an outer diameter of the absorber piston.

4. The assembly according to claim 1, wherein the piston rod is formed with a hollow space and a diameter of said hollow space is greater than a wall thickness of a wall surrounding said hollow space.

5. The assembly according to claim 1, wherein said absorber piston is disposed to subdivide said absorber chamber into said first chamber and a second chamber and wherein said second chamber is at least partly filled with the absorber fluid.

6. The assembly according to claim 1, wherein a radial clearance between an annular chamber formed by said space around said piston rod and an axis of symmetry of said absorber cylinder is larger than a radial distance of said absorber duct from the axis of symmetry of said absorber cylinder.

7. The assembly according to claim 1, wherein a radius of said piston rod is greater than a radial distance of said absorber duct from an axis of symmetry of said absorber cylinder or wherein a flow duct extends from said first chamber to said absorber valve, and said flow duct extends radially inwardly at least in part.

8. The assembly according to claim 1, wherein the field generating device is an electric coil disposed on said damper piston, said coil having windings extending substantially around an axis transverse to a longitudinal axis of said damper cylinder.

9. The assembly according to claim 1, which comprises a reflux duct which is equipped with at least one one-way valve.

10. The assembly according to claim 1, which comprises a reflux duct to be released in dependence on a stroke.

11. The assembly according to claim 1, wherein an operating pressure of the absorber fluid in said first chamber in an idle state is less than 10 bar and wherein a maximum mean operating pressure in said first chamber in a damping state is greater than 100 bar.

12. The assembly according to claim 11, wherein the operating pressure of the absorber fluid in said first chamber in the idle state is less than 1.5 bar and the maximum mean operating pressure in said first chamber in the damping state is greater than 500 bar.

13. The assembly according to claim 11, wherein an operating pressure in said second chamber in the idle state is less than 10 bar and the operating pressure in said second chamber in the damping state is less than the operating pressure in the idle state.

14. The assembly according to claim 1, wherein said energy absorber is one of two energy absorbers respectively disposed in one of two units.

15. The assembly according to claim 14, wherein said two units are disposed to absorb shocks in mutually different directions of movement.

16. The assembly according to claim 1, which comprises one or both of at least one biasing device or at least one resetting device disposed to act as an extension spring between said fastener and said holding device.

17. The assembly according to claim 1, wherein said second chamber is defined by said absorber piston, said absorber cylinder and an end cover.

18. The assembly according to claim 1, wherein at least part of a control device or at least one energy storage device is disposed in a hollow space of said piston rod.

19. The assembly according to claim 1, which comprises at least one shearing device disposed to allow a relative motion between said absorber cylinder and said piston device to exceed a predetermined range only as the load reaches a level where permissible shearing forces of said shearing device are exceeded and destruction of said shearing device is caused.

20. The assembly according to claim 1, comprising a seat device of a transport vehicle, and wherein said holding device is connected with said seat device and said fastener is connected with a body of said transport vehicle.

21. The assembly according to claim 20, wherein said seat device is fastened by way of two units, and wherein at least one of said units comprises said energy absorber.

22. The assembly according to claim 20, wherein said unit is configured to achieve lowest possible load values in relative speeds of >5 m/sec.

\* \* \* \* \*